US012669812B2

(12) United States Patent (10) Patent No.: US 12,669,812 B2
Kanai (45) Date of Patent: Jun. 30, 2026

(54) ROBOT TEACHING DEVICE AND ROBOT TEACHING METHOD

(71) Applicant: HITACHI, LTD., Tokyo (JP)

(72) Inventor: Yoshiki Kanai, Tokyo (JP)

(73) Assignee: HITACHI, LTD., Tokyo (JP)

( * ) Notice: Subject to any disclaimer, the term of this patent is extended or adjusted under 35 U.S.C. 154(b) by 62 days.

(21) Appl. No.: 18/863,706

(22) PCT Filed: Apr. 20, 2023

(86) PCT No.: PCT/JP2023/015825
§ 371 (c)(1),
(2) Date: Nov. 7, 2024

(87) PCT Pub. No.: WO2023/248602
PCT Pub. Date: Dec. 28, 2023

(65) Prior Publication Data
US 2025/0303557 A1 Oct. 2, 2025

(30) Foreign Application Priority Data

Jun. 20, 2022 (JP) ................................. 2022-098900

(51) Int. Cl.
*G05B 19/42* (2006.01)
*B25J 9/16* (2006.01)
(52) U.S. Cl.
CPC ............ *G05B 19/42* (2013.01); *B25J 9/1664* (2013.01); *G05B 2219/35464* (2013.01); *G05B 2219/40391* (2013.01); *G05B 2219/40607* (2013.01)
(58) Field of Classification Search
CPC .................. B25J 9/1664; G05B 19/42; G05B 2219/40391; G05B 2219/40607
See application file for complete search history.

(56) References Cited

U.S. PATENT DOCUMENTS

2011/0208355 A1* 8/2011 Tsusaka .................... B25J 13/08
901/31
2018/0345491 A1 12/2018 Iwamoto
2021/0379758 A1* 12/2021 Chu ........................ B25J 9/1661

FOREIGN PATENT DOCUMENTS

JP 11-345018 A 12/1999
JP 2015-071206 A 4/2015
(Continued)

OTHER PUBLICATIONS

International Search Report of PCT/JP2023/015825 dated Jun. 27, 2023.

*Primary Examiner* — Dale Moyer
(74) *Attorney, Agent, or Firm* — MATTINGLY & MALUR, PC

(57) ABSTRACT

A robot teaching device and a robot teaching method with which a robot can be caused to carry out a series of tasks with high work efficiency. A feature quantity acquisition unit acquires feature quantity data indicating an amount of effect that an action of a worker has on work targets; an important point period determination unit determines, from periods for which action data is acquired and on the basis of the feature quantity data, periods in which the worker is performing actions essential to the series of tasks, as important point periods; and a teaching data generation unit generates, on the basis of the action data, teaching data to be input into robots so that the actions of the worker in the important point periods are reproduced and the actions of the worker outside the important point periods are not reproduced.

8 Claims, 7 Drawing Sheets

(56)     References Cited

FOREIGN PATENT DOCUMENTS

| JP | 6038417 | B1 | 12/2016 |
| JP | 2018-015863 | A | 2/2018 |

* cited by examiner

ROBOT TEACHING DEVICE AND ROBOT TEACHING METHOD

TECHNICAL FIELD

This invention relates to a robot teaching device and robot teaching method.

BACKGROUND ART

Robots have been introduced to save labor and promote automation in various field works. A teaching operation is necessary for causing a robot to perform a desired task. For the purpose of reducing the steps of teaching, multiple techniques have been proposed to capture a teacher's motion with a device such as a camera as in teaching by showing and transform the motion to a robotic motion.

For example, Patent Literature 1 provides a robot teaching device that detects an operator's finger motion from an image captured by an image input device and produces a robot control program for reproducing task contents.

CITATION LIST

Patent Literature

Patent Literature 1: Japanese Patent No. 6038417

SUMMARY OF INVENTION

Technical Problem

In the robot teaching device disclosed in Patent Literature 1, however, when an operator's motion is to be performed by a robot as it is, unnecessary motions such as hand trembling, hesitation, and an error by an operator may be reproduced. This may reduce the working efficiency of the robot. Moreover, when an operator's motion is estimated to replan a robotic motion such that the robot can easily work, it is difficult to completely reproduce the intention of the operator especially in a skilled work and work in which precision is required.

The present invention has been devised in view of the problem. An object of the present invention is to provide a robot teaching device and a robot teaching method that can cause a robot to execute the series of tasks with high working efficiency.

Solution to Problem

In order to achieve above object, the present invention provides a robot teaching device for teaching a robot a series of tasks performed on a task object by an operator, and the robot teaching device includes: a motion acquisition unit that acquires motion data indicating a position and an attitude of the operator or the task object; a feature amount acquisition unit that acquires feature amount data indicating a degree of influence of a motion of the operator on the task object; a priority period determination unit that determines a period during which the operator makes a motion indispensable for the series of tasks from among periods during which the motion data is acquired, as a priority period on a basis of the feature amount data; and a teaching data generation unit that generates teaching data to be input to the robot, the teaching data being generated on a basis of the motion data such that a motion of the operator in the priority period is reproduced while a motion of the operator in periods other than the priority period are not reproduced.

Further, the present invention provides a robot teaching method for teaching a robot a series of tasks performed on a task object by an operator, and the robot teaching method includes: acquiring motion data indicating a position and an attitude of the operator or the task object; acquiring feature amount data indicating a degree of influence of a motion of the operator on the task object; determining a period during which the operator makes a motion indispensable for the series of tasks from among periods during which the motion data is acquired, as a priority period on a basis of the feature amount data; and generating teaching data to be input to the robot, the teaching data being generated on a basis of the motion data such that a motion of the operator in the priority period is reproduced while a motion of the operator in periods other than the priority period are not reproduced.

Advantageous Effects of Invention

According to the present invention, it is possible to cause a robot to execute the series of tasks with high working efficiency.

DESCRIPTION OF EMBODIMENTS

Figure 1:
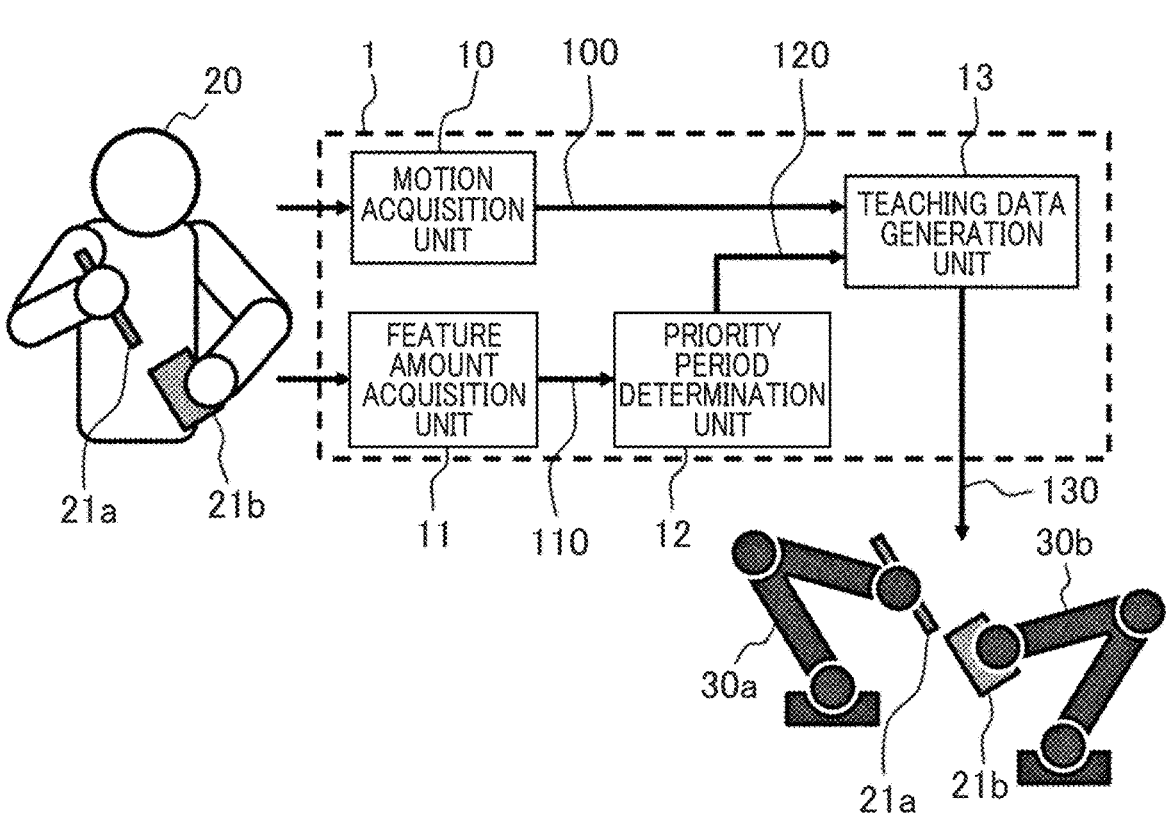
FIG. 1 illustrates the outline of a robot teaching device according to a first embodiment of the present invention.

Embodiments of the present invention will be described below in accordance with the accompanying drawings. In the drawings, equivalent elements are denoted by the same reference numerals, and duplicate descriptions thereof are omitted as appropriate.

First Embodiment

FIG. 1 illustrates the outline of a robot teaching device 1 according to a first embodiment of the present invention.

The robot teaching device 1 is a device aimed at causing a robot 30 to execute the same task as in a demonstration of handling task objects 21*a* and 21*b* by an operator 20 serving as a teacher. The robot teaching device 1 includes a computer having an arithmetic processing function and an input/output interface that inputs and outputs signals to and from an external device. The robot teaching device 1 implements the functions of the respective units by executing a program stored in a storage device such as an HDD.

A motion acquisition unit 10 acquires the motions of a teacher 20 or the measured values of the positions and attitudes of the task objects 21*a* and 21*b* as motion data 100 and outputs the data to a teaching data generation unit 13. A feature amount acquisition unit 11 acquires feature amount data 110 for determining a key motion (described later) from a teaching state of the teacher 20 and outputs the data to a priority period determination unit 12. The priority period determination unit 12 determines a period during which a key motion is made, as a priority period on the basis of the feature amount data 110, and outputs the determination result (priority period data 120) to the teaching data generation unit 13. The teaching data generation unit 13 generates, from the motion data 100, teaching data 130 for reproducing only the motion of the priority period and making motions in other periods as optimum paths in robots 30*a* and 30*b* and inputs the data to the robots 30*a* and 30*b*.

The key motion refers to an indispensable motion for executing a task in a series of teaching operations. For example, in the case of a sealing task, the robots 30*a* and 30*b* can be caused to execute the sealing task by reproducing hand motions of the teacher 20 in the motions of holding a seal, pressing the seal onto a vermilion inkpad, pressing the seal onto a sheet of paper, and placing the seal, whereas hand motions of the teacher 20 in the motions of moving the seal and confirming the position of sealing are not necessarily reproduced. The robot teaching device 1 according to the present embodiment is configured to improve the work efficiency of the robots 30*a* and 30*b* by extracting only an indispensable motion for a series of tasks and teaching the motion to the robots 30*a* and 30*b*.

Figure 2:
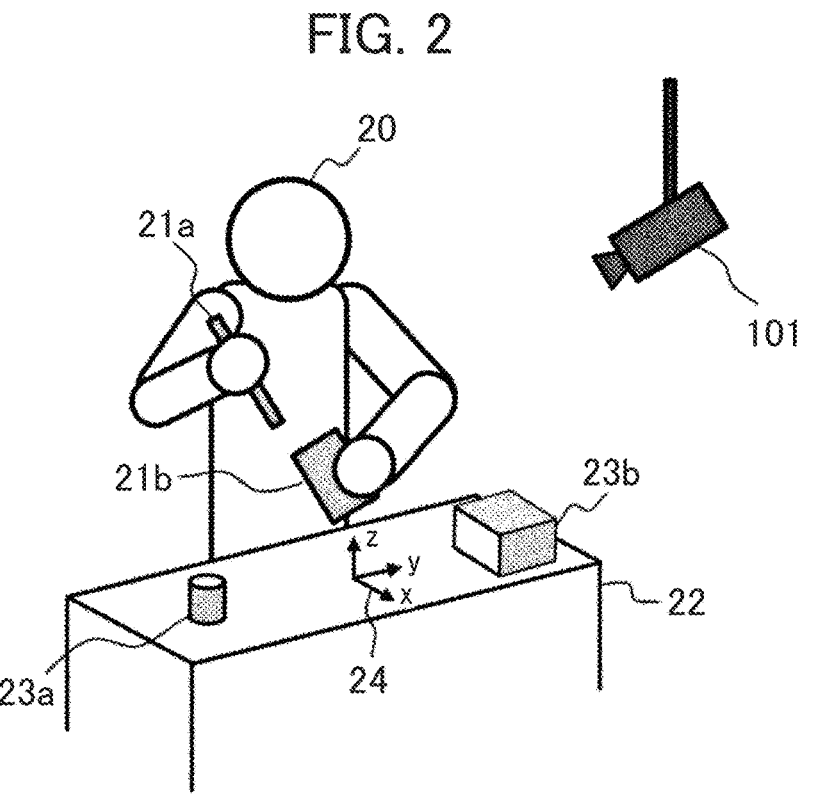
FIG. 2 illustrates a state in which the motion of a teacher is acquired according to the first embodiment of the present invention.

FIG. 2 illustrates a state in which the motion of the teacher 20 is acquired. It is assumed that the teacher 20 holding the task objects 21*a* and 21*b* in front of a worktable 22 performs a predetermined task. It is assumed that a structure 23 is placed on the worktable 22 and the teacher 20 moves while avoiding interfering with the task objects 21*a* and 21*b* held by the teacher 20 and the structure 23, or makes contacting motions such as pressing or rubbing.

The motions of the teacher 20 are acquired by a motion acquisition device 101. The motion acquisition device 101 is, for example, a camera, a positioning sensor, or a motion capture system. The motion data 100 obtained by the motion acquisition device 101 is six-dimensional time-series data on positions (x, y, z) and attitudes (roll, pitch, yaw) that are viewed from a worktable coordinate system 24 defined on the worktable 22.

Figure 3:
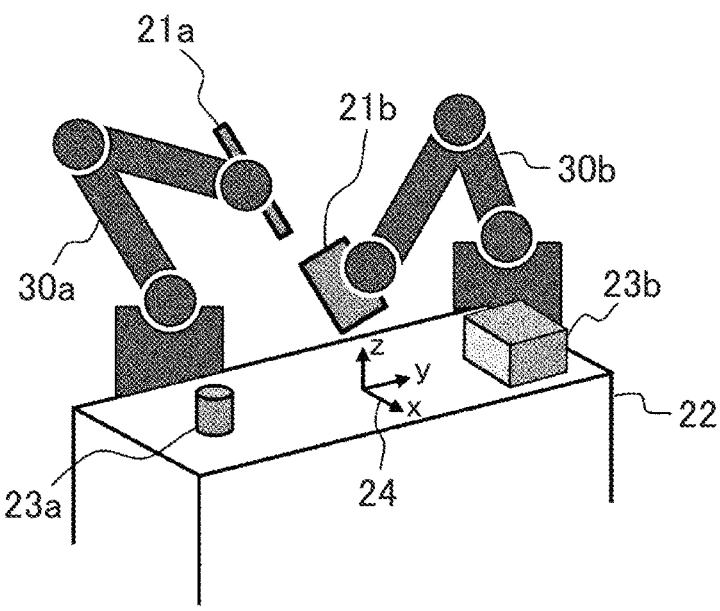
FIG. 3 illustrates a state in which robots are caused to perform a taught operation according to the first embodiment of the present invention.

FIG. 3 illustrates a state in which the robots 30*a* and 30*b* are caused to perform a taught motion. It Is assumed that a task environment including the task object 21, the worktable 22, and structures 23*a* and 23*b* is identical to that in teaching illustrated in FIG. 2. It is assumed that the positional relationship between the robots 30*a* and 30*b* and the worktable coordinate system 24 has been known by predetermined fixation at a unique position or recognition with a camera or the like. When the teaching data 130 is executed, the joint angles of the robots 30*a* and 30*b* are calculated such that the positions and attitudes of the fingers of the robots

30*a* and 30*b* agree with the positions and attitudes of the teaching data 130, and the teaching data 130 is executed in time sequence, so that the taught motion is reproduced.

With this configuration, the motion data 100 during the teaching operation is acquired by the motion acquisition unit 10, and the motion data 100 is executed by the robots 30*a* and 30*b*, causing the robots 30*a* and 30*b* to reproduce the taught motion.

Figure 4:
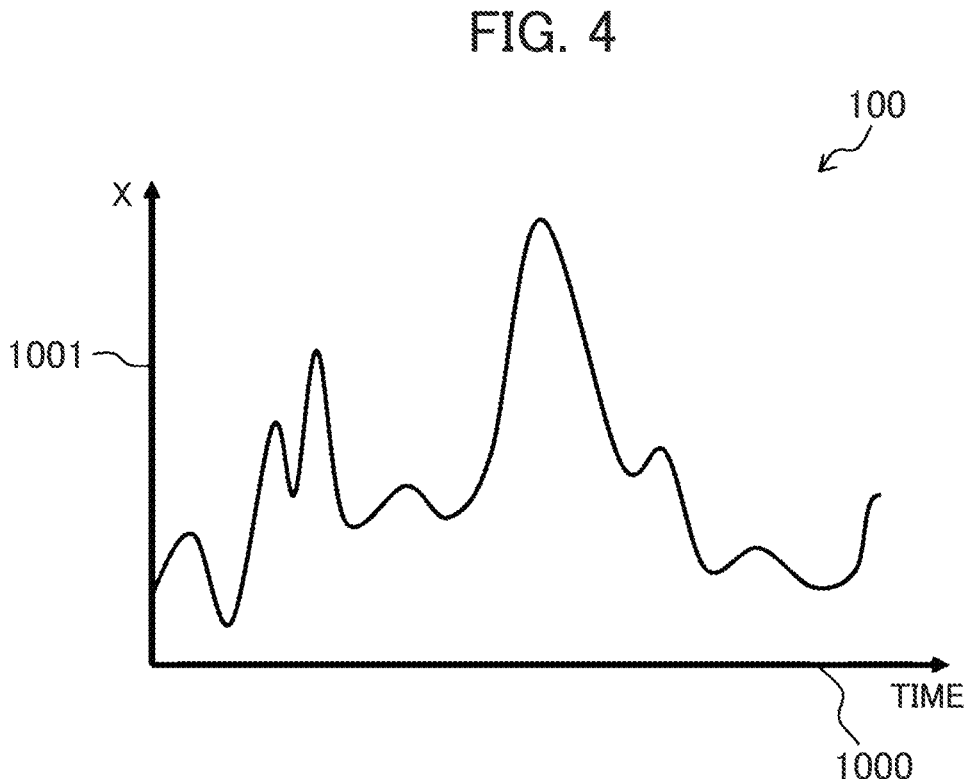
FIG. 4 shows portion of motion data acquired by a motion acquisition unit according to the first embodiment of the present invention.

FIG. 4 shows portion of the six-dimensional motion data 100 acquired by the motion acquisition unit 10. The horizontal axis is a motion-data time axis 1000, and the vertical axis is a motion-data displacement axis 1001 that indicates a change of position on the x-axis. This data may include unnecessary motions such as trembling hands or mistakes by the teacher 20. Such unnecessary motions are assumed to be difficult to identify only with the motion data 100.

Figure 5:
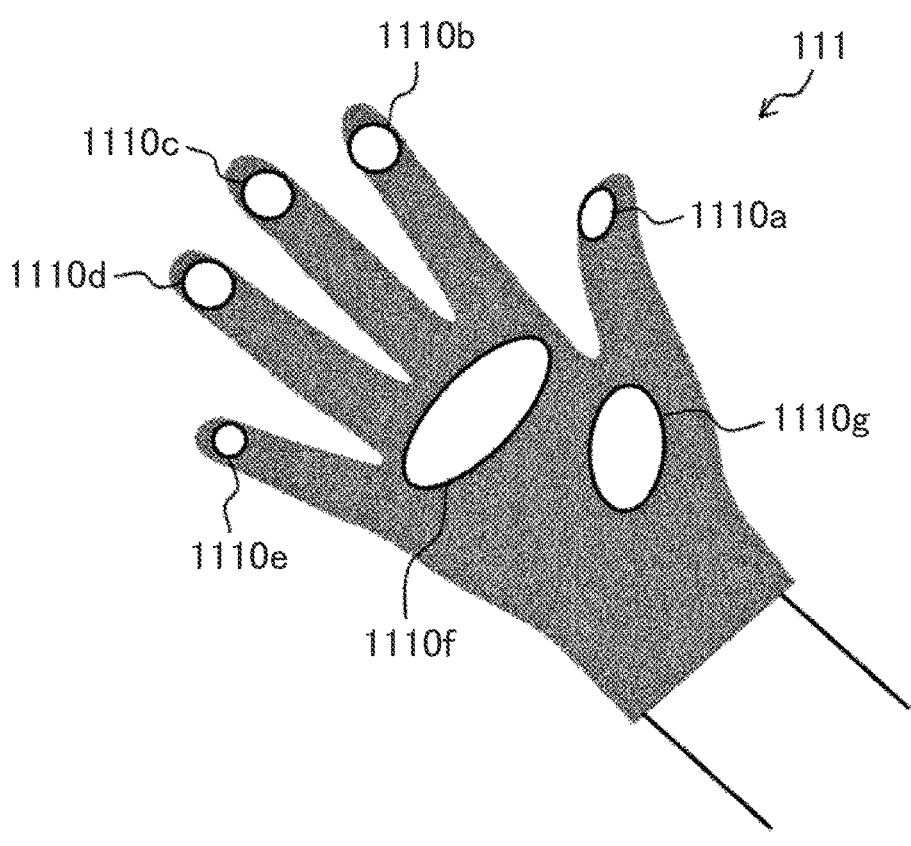
FIG. 5 illustrates a glove worn by the teacher according to the first embodiment of the present invention.

FIG. 5 illustrates a glove 111 worn by the teacher 20. The features of key motions such as holding and pressing motions assumed in the present embodiment include a change of a contact force between the task objects 21*a* and 21*b* and a hand of the teacher 20. Thus, a contact force between the task objects 21*a* and 21*b* and a hand of the teacher 20 is measured as a value (feature amount) indicating the degree of influence of a motion of the operator 20 on the task objects 21*a* and 21*b*, and a period during which a contact force (feature amount) changes is extracted as a period (priority period) during which a key motion is made. In the present embodiment, a change of the contact force (feature amount) is acquired as the feature amount data 110 through the glove 111 worn by the teacher 20.

A plurality of pressure sensors 1110*a* to 1110*g* are disposed on the glove 111. The measured values of the pressure sensors 1110*a* to 1110*g* are acquired as the feature amount data 110 while the motion data 100 is acquired by the motion acquisition unit 10. Thus, the feature amount data 110 in the present embodiment is six-dimensional time-series data. In the example of FIG. 5, the pressure sensors 1110*a* to 1110*g* are disposed on the balls of fingers and the palm of a hand. The positions and the number of pressure sensors 1110*a* to 1110*g* are not limited.

Figure 6:
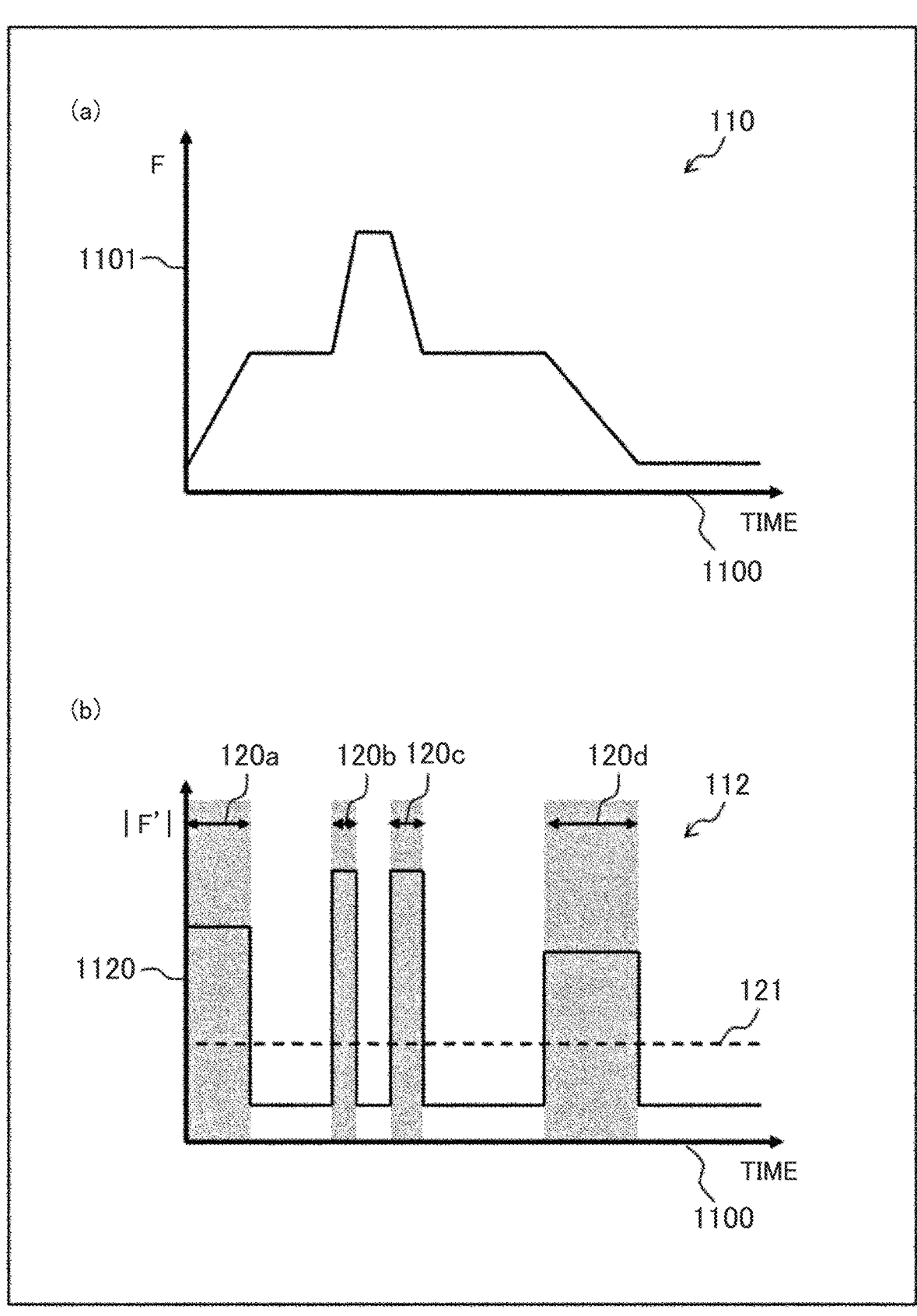
FIG. 6 shows an example of a priority period determination method according to the first embodiment of the present invention.

FIG. 6 shows an example of a priority period determination method.

FIG. 6(*a*) is a graph showing the feature amount data 110 acquired by one of the pressure sensors 1110*a* to 1110*g* on the glove 111. In this graph, the horizontal axis is a feature-amount-data time axis 1100 at the same scale as the motion-data time axis 1000, and the vertical axis is a feature-amount data axis 1101.

FIG. 6(*b*) shows a method for determining a priority period. First, feature-amount-data time-derivative absolute value data 112 is obtained by differentiating the feature amount data 110 with respect to a time. In the graph, the horizontal axis is the feature-amount-data time axis 1100, and the vertical axis is a feature-amount data time-derivative absolute value axis 1120. Subsequently, a threshold value 121 for determining a priority period is set, and periods during which a feature-amount-data time-derivative absolute value exceeds the threshold value 121 are determined as priority periods 120*a* to 120*d*.

This configuration can extract a period during which a change of a contact force between the task objects 21*a* and 21*b* and the hands of the teacher 20.

Figure 7:
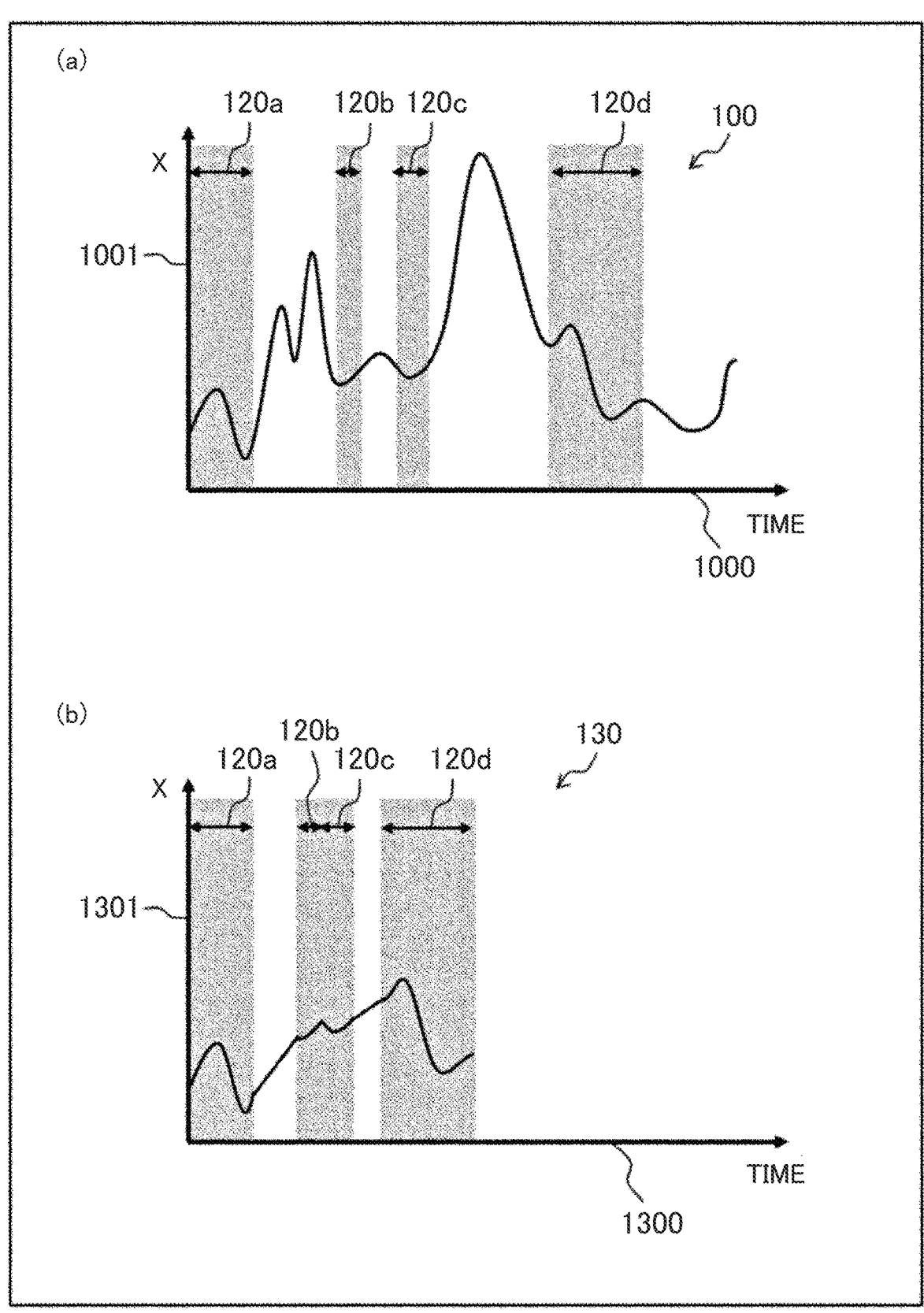
FIG. 7 shows an example of processing in a teaching data generation unit according to the first embodiment of the present invention.

FIG. 7 shows an example of processing in the teaching data generation unit 13.

FIG. 7(*a*) shows the priority periods 120*a* to 120*d* of the motion data 100. In order to attain the object of the series of tasks by the robots 30*a* and 30*b*, the motion data 100 needs to be reproduced as it is in the teaching data 130 without changing the displacement and the time scale of the motion data 100 of the priority periods 120a to 120d. The reproduction is not necessary in other periods.

FIG. 7(*b*) shows an example of the teaching data 130 when paths are produced to make linear shapes on a finger space in periods other than the priority periods 120a to 120d. In the graph, the horizontal axis is a teaching-data time axis 1300 at the same scale as the motion-data time axis 1000, and the vertical axis is a teaching-data displacement axis 1301.

The teaching data 130 in a period other than the priority periods 120a to 120d is generated to make a motion for the shortest path in consideration of a displacement from the final value of the previous priority period to the initial value of the subsequent priority period, and the ranges of motion, the maximum permissible speeds, and the maximum permissible accelerations of the robots 30a and 30b. Moreover, in order to reproduce the motion of the teacher 20 in the priority periods 120a to 120d, the time axes of all the six-dimensional elements of the motion data 100 in the priority periods 120a to 120d need to agree with those in the teaching data 130. Thus, even when a displacement from a priority period of a one-dimensional element to the subsequent priority period is 0, the one-dimensional element keeps its value until the element of another dimension reaches the initial value of the subsequent priority period.

The teaching data 130 in a period other than the priority periods 120a to 120d may have a linear shape on the joint spaces of the robots 30a and 30b or may form a path such that the structures 23a and 23b, the task objects 21a and 21b, and the fingers of the robots 30a and 30b do not interfere with one another.

Figure 8:
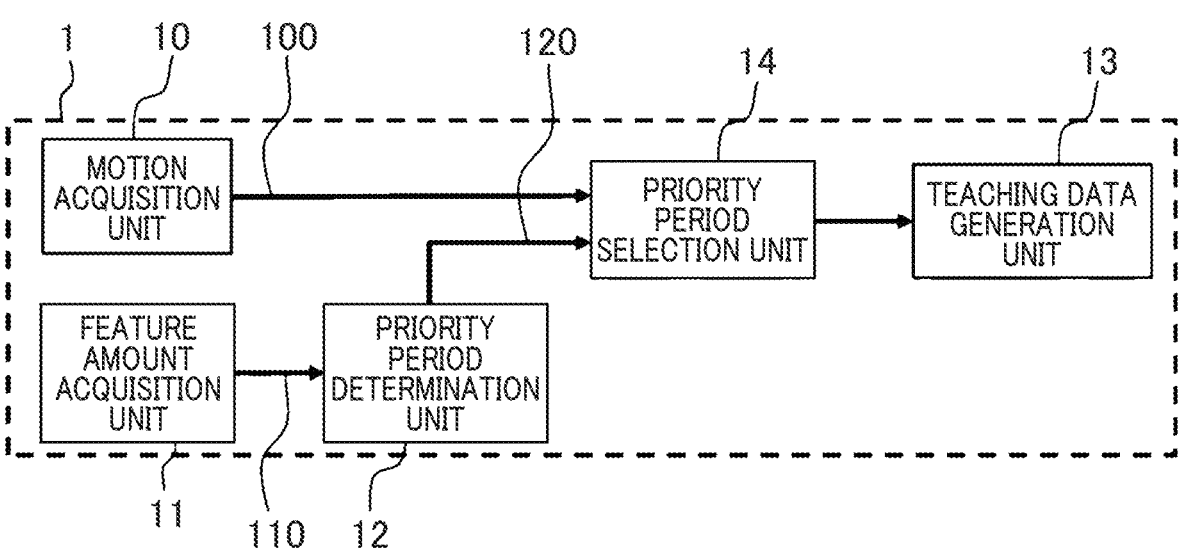
FIG. 8 illustrates a modification of the robot teaching device according to the first embodiment of the present invention.

FIG. 8 illustrates a modification of the robot teaching device 1 according to the present embodiment. In FIG. 8, the robot teaching device 1 further includes a priority period selection unit 14. The priority period selection unit 14 provides means that displays the priority periods 120a to 120d determined by the priority period determination unit 12 and the motion data 100 and allows the teacher 20 or another user to select the priority period to be reproduced as teaching data from among the priority periods 120a to 120d determined by the priority period determination unit 12.

Summary

In this embodiment, in a robot teaching device 1 for teaching robots 30a, 30b a series of tasks performed on task objects 21a, 21b by an operator 20, the robot teaching device 1 includes: in the series of tasks, a motion acquisition unit 10 that acquires motion data 100 indicating a position and an attitude of the operator 20 or the task objects 21a, 21b; in the series of tasks, a feature amount acquisition unit 11 that acquires feature amount data 110 indicating a degree of influence of a motion of the operator 20 on the task objects 21a, 21b; a priority period determination unit 12 that determines a period during which the operator 20 makes a motion indispensable for the series of tasks from among periods during which the motion data 100 is acquired, as priority periods 120a to 120d on a basis of the feature amount data 110; and a teaching data generation unit 13 that generates teaching data 130 to be input to the robots 30a, 30b, the teaching data 130 being generated on a basis of the motion data 100 such that a motion of the operator 20 in the priority periods 120a to 120d is reproduced while a motion of the operator 20 in periods other than the priority periods 120a to 120d are not reproduced.

Furthermore, a robot teaching method for teaching the robots 30a and 30b a series of tasks performed on the task objects 21a and 21b by the operator 20, the method including: acquiring the motion data 100 indicating the positions and attitudes of the operator 20 or the task objects 21a and 21b; acquiring the feature amount data 110 indicating the degree of influence of the motion of the operator 20 on the task objects 21a and 21b; determining periods during which the operator 20 makes motions indispensable for the series of tasks from among periods during which the motion data 100 is acquired, as the priority periods 120a to 120d on the basis of the feature amount data 110; and generating the teaching data 130 to be input to the robots 30a and 30b, the teaching data 130 being generated on the basis of the motion data 100 such that the motions of the operator 20 in the priority periods 120a to 120d are reproduced while the motions of the operator 20 in periods other than the priority periods 120a to 120d are not reproduced.

According to the present embodiment configured as above, the teaching data 130 of the robots 30a and 30b is generated such that among periods during which the motion data 100 of the operator 20 or the task objects 21a and 21b is acquired, the motion data 100 is reproduced in the priority periods 120a to 120d, during which the degree of influence of the motion of the operator 20 on the task objects 21a and 21b is high, whereas the motion data 100 in other periods is not reproduced. Thus, the teaching data is generated such that operator's motions indispensable for the series of tasks is reproduced while other unnecessary motions are not reproduced, causing the robots 30a and 30b to execute the series of tasks with high work efficiency.

The robot teaching device 1 according to the present embodiment further includes the glove 111 to be worn by the operator 20 and the pressure sensors 1110a to 1110g attached to the glove 111, and the feature amount acquisition unit 11 acquires the measured values of the pressure sensors 1110a to 1110g as the feature amount data 110. This can extract the priority periods 120a to 120d on the basis of a contact force between the task objects 21a and 21b and a hand of the operator 20.

Moreover, the priority period determination unit 12 according to the present embodiment determines, as the priority periods 120a to 120d, periods during which the time-derivative absolute values of the measured values of the pressure sensors 1110a to 1110g are equal to or larger than the predetermined threshold value 121 among periods during which the motion data 100 is acquired. Thus, periods during which a contact force changes between the task objects 21a and 21b and the hands of the operator 20 can be extracted as the priority periods 120a to 120d.

The teaching data generation unit 13 according to the present embodiment generates the teaching data 130 in a period other than the priority periods 120a to 120d such that the time axes of the elements of the motion data 100 in the priority periods 120a to 120d agree with those in the teaching data 130 and a motion is made for the shortest path under the restrictions of the ranges of motion, the maximum permissible speeds, and the maximum permissible accelerations of the robots 30a and 30b. This simplifies unnecessary motions to a minimum in the series of tasks, achieving the maximum work efficiency.

The robot teaching device 1 according to the present embodiment further includes the priority period selection unit 14 that allows the operator 20 or another user to select whether the motion data 100 in a period determined as a priority period by the priority period determination unit 12 is to be reproduced in the teaching data 130. Thus, when the operator 20 or another user determines that the motion data 100 in a priority period does not need to be reproduced, the motion data 100 is not reproduced in the teaching data 130, thereby further improving the work efficiency of the robots 30a and 30b.

Second Embodiment

Figure 9:
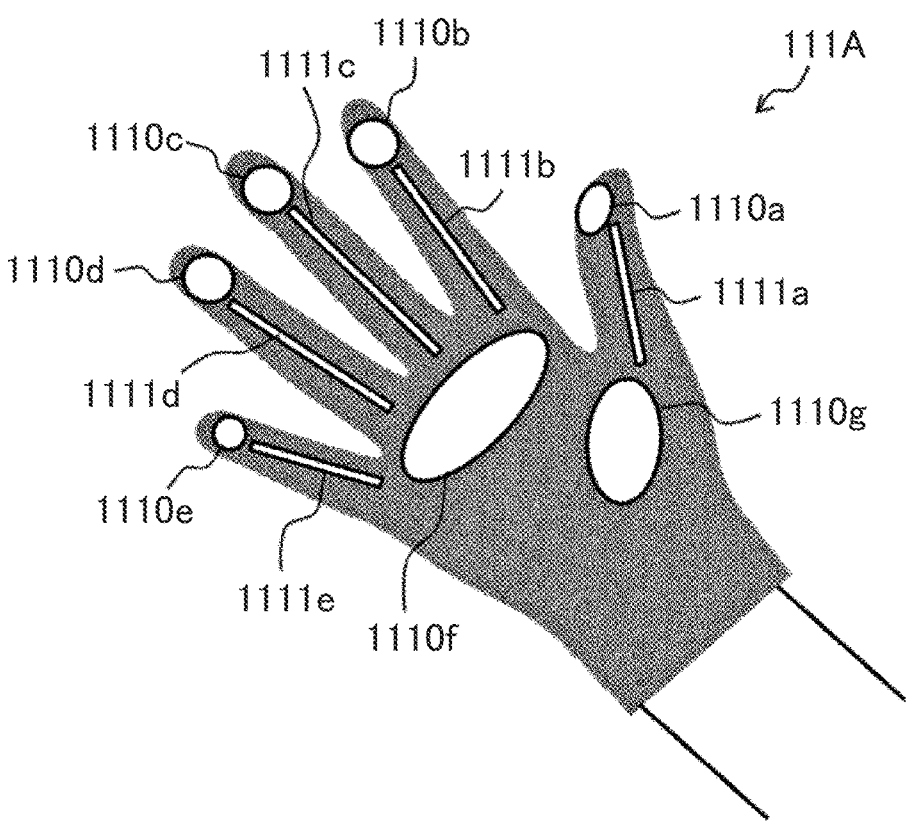
FIG. 9 illustrates a glove which is to be worn by a teacher according to a second embodiment of the present invention.
Figure 10:
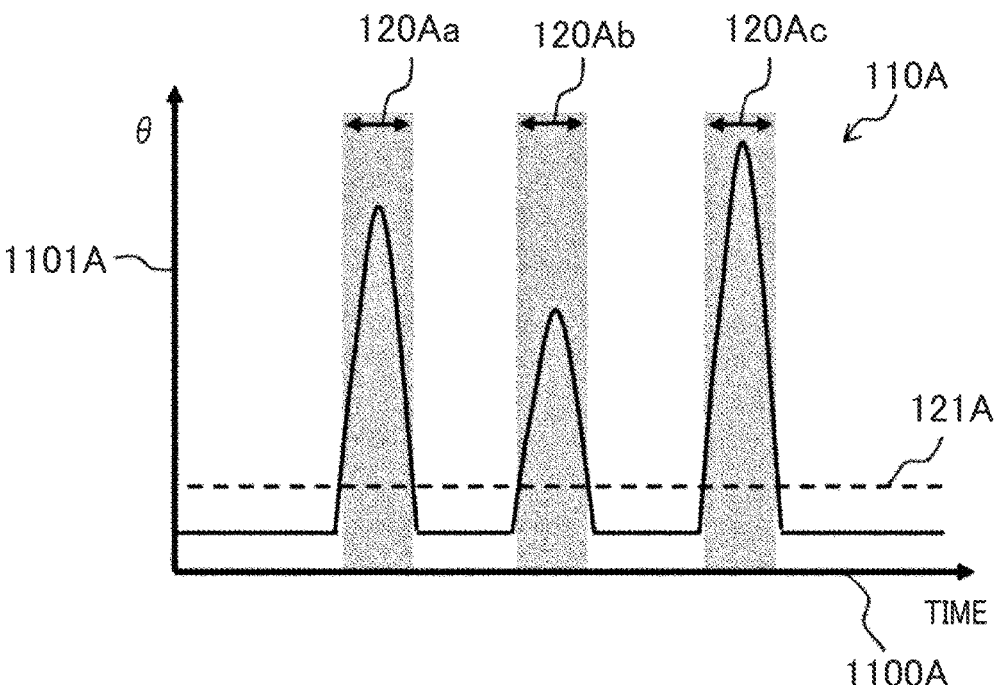
FIG. 10 shows an example of a priority period determination method according to the second embodiment of the present invention.

Referring to FIGS. 9 and 10, the configuration of a priority period determination unit 12 according to a second embodiment of the present invention will be described below. Configurations not illustrated in FIGS. 9 and 10 are identical to those of the first embodiment.

FIG. 9 illustrates a glove 111A which is to be worn by a teacher 20 according to the present embodiment. Placed on the glove 111A are a plurality of pressure sensors 1110a to 1110g and bend sensors 1111a to 1111e for measuring the bending angles of fingers. In the example of FIG. 9, the pressure sensors 1110a to 1110g are disposed on the balls of fingers and the palm of a hand, and the bend sensors 1111a to 1111e are disposed on all the fingers. The positions and the number of sensors are not limited.

FIG. 10 shows an example of a priority period determination method according to the present embodiment. The horizontal axis is a feature-amount-data time axis 1100A, and the vertical axis is a feature-amount data axis 1101A. In the present embodiment, periods during which feature amount data 110A acquired by one of the bend sensors 1111a to 1111e of the glove 111A exceeds a threshold value 121A are determined as priority periods 120Aa to 120Ac.

The priority periods 120Aa to 120Ac determined by the bend sensors 1111a to 1111e and priority periods 120a to 120d determined by the pressure sensors 1110a to 1110g are integrated, to thereby obtain final priority period data 120.
Summary A feature amount acquisition unit 11 according to the present embodiment acquires, as feature amount data 110, the measured values of the sensors 1110a to 1110g and 1111a to 1111e of multiple types for measuring different physical quantities.

According to the present embodiment configured thus, the feature amount data 110 is acquired using the sensors 1110a to 1110g and 1111a to 1111e of multiple types for measuring different physical quantities, thereby improving the accuracy of the priority period data 120. For example, in a state in which push buttons are placed on task objects 21a and 21b and the behaviors of the task objects 21a and 21b vary with the pressing amount of the buttons, the present configuration is effective when a teacher 20 selects a priority period on a priority period selection unit 14 shown in FIG. 8.

Third Embodiment

Figure 11:
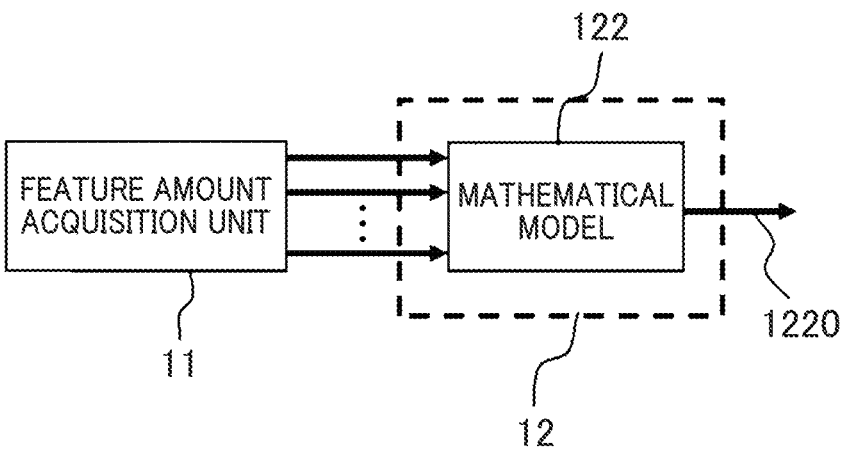
FIG. 11 shows the configuration of a priority period determination unit according to a third embodiment of the present invention.

Referring to FIG. 11, the configuration of a priority period determination unit 12 according to a third embodiment of the present invention will be described below. Configurations not illustrated in FIG. 11 are identical to those of the first or second embodiment.

When multiple types of sensors (see FIG. 9) are handled as described in the second embodiment (see FIG. 9), the number of priority periods determined by the priority period determination unit 12 increases with increase of the number of sensors. Thus, for the priority period selection unit 14 (see FIG. 8) in the modification of the first embodiment, it is difficult to allow the teacher 20 or another user to select the priority period to be reproduced as teaching data.

Hence, the priority period determination unit 12 according to the present embodiment is configured to output, for multiple sensor inputs, a probability 1220 that motion data 100 has points in the priority period to a priority period selection unit 14 (see FIG. 8) by using a mathematical model 122 such as a neural network as shown in FIG. 11. The mathematical model 122 for calculating the probability 1220 is not limited to a neural network.
Summary The robot teaching device 1 according to the present embodiment includes the priority period selection unit 14 that allows an operator 20 or another user to select whether the points of a period during which motion data 100 is acquired are to be reproduced in teaching data 130. On the basis of the measured values of sensors 1110a to 1110g and 1111a to 1111e of multiple types, the priority period determination unit 12 calculates a probability that a priority period includes the points of the period during which the motion data 100 is acquired, and outputs the probability to the priority period selection unit 14. When the operator 20 or another user is allowed to select whether the points of the motion data 100 are to be reproduced in the teaching data 130, the priority period selection unit 14 displays the probability that the priority period includes the points of the period during which the motion data 100 is acquired.

According to the present embodiment configured thus, the feature amount data 110 is acquired using multiple types of sensors. Thus, even when multiple priority periods are determined by the priority period determination unit 12, the priority period selection unit 14 (see FIG. 8) allows the teacher 20 or another user to easily select the priority period to be reproduced in the teaching data 130.

Embodiments of the present invention was described in detail, but the present invention is not limited to the above-described embodiments, and further includes various modifications. For example, the above-described embodiments have been described in detail in order to facilitate the understanding of the present invention, and the present invention is not necessarily limited to those including all of the described configurations. Moreover, the configuration of one embodiment may include part of the configuration of another embodiment, may be partially deleted, or may be replaced with part of the configuration of another embodiment.

LIST OF REFERENCE SIGNS

1: Robot teaching device, 10: Motion acquisition unit, 11: Feature amount acquisition unit, 12: Priority period determination unit, 13: Teaching data generation unit, 14: Priority period selection unit, 20: Operator (teacher), 21a, 21b: Task object, 22: Worktable, 23a, 23b: Structure, 24: Worktable coordinate system, 30a, 30b: Robot, 100: Motion data, 101: Motion acquisition device, 110, 110A: Feature amount data, 111, 111A: Glove, 112: Feature-amount-data time-derivative absolute value data, 120: Priority period data, 120a to 120d: Priority period, 120Aa to 120Ac: Priority period, 121, 121A: Threshold value, 122: Mathematical model, 130: Teaching data, 1000: Motion-data time axis, 1001: Motion-data displacement axis, 1100, 1100A Feature-amount-data time axis, 1101, 1101A: Feature-amount data axis, 1110a to 1110g: Pressure sensor, 1111a to 1111e: Bend sensor, 1120: Feature-amount data time-derivative absolute value axis, 1210: Motion acquisition unit, 1220: Probability, 1300: Teaching-data time axis, 1301: Teaching-data displacement axis

The invention claimed is:
1. A robot teaching device for teaching a robot a series of tasks performed on a task object by an operator,
the device comprising:

9 a motion acquisition unit that acquires motion data indicating a position and an attitude of the operator or the task object;

a feature amount acquisition unit that acquires feature amount data indicating a degree of influence of a motion of the operator on the task object;

a priority period determination unit that determines a period during which the operator makes a motion indispensable for the series of tasks from among periods during which the motion data is acquired, as a priority period on a basis of the feature amount data; and a teaching data generation unit that generates teaching data to be input to the robot, the teaching data being generated on a basis of the motion data such that a motion of the operator in the priority period is reproduced while a motion of the operator in periods other than the priority period are not reproduced.

2. The robot teaching device according to claim 1, further comprising:

a glove that is to be worn by the operator; and a pressure sensor that is attached to the glove, wherein the feature amount acquisition unit acquires a measured value of the pressure sensor as the feature amount data.

3. The robot teaching device according to claim 2, wherein the priority period determination unit determines, as the priority period, a period during which a time-derivative absolute value of a measured value of the pressure sensor is equal to or larger than a predetermined threshold value among periods during which the motion data is acquired.

4. The robot teaching device according to claim 1, wherein the teaching data generation unit generates the teaching data in a period other than the priority period such that time axes of elements of the motion data in the priority period agree with time axes in the teaching data and a motion is made for a shortest path under restrictions of a range of motion, a maximum permissible speed, and a maximum permissible acceleration of the robot.

5. The robot teaching device according to claim 1, further comprising:

a priority period selection unit that allows the operator or another user to select whether the motion data in a period determined as the priority period by the priority period determination unit is to be reproduced in the teaching data.

6. The robot teaching device according to claim 1, further comprising:

multiple types of sensors that measure different physical quantities as the feature amount data, wherein the feature amount acquisition unit acquires measured values of the multiple types of sensors as the feature amount data.

7. The robot teaching device according to claim 6, further comprising:

a priority period selection unit that allows the operator or another user to select whether or not points of a period during which the motion data is acquired are to be reproduced in the teaching data, wherein on the basis of the measured values of the multiple types of sensors, the priority period determination unit calculates a probability that the priority period includes the points of the period during which the motion data is acquired, and outputs the probability to the priority period selection unit, and when the operator or another user is allowed to select whether the points of the motion data are to be reproduced in the teaching data, the priority period selection unit displays the probability that the priority period includes the points of the period during which the motion data is acquired.

8. A robot teaching method for teaching a robot a series of tasks performed on a task object by an operator, the method comprising:

acquiring motion data indicating a position and an attitude of the operator or the task object;

acquiring feature amount data indicating a degree of influence of a motion of the operator on the task object;

determining a period during which the operator makes a motion indispensable for the series of tasks from among periods during which the motion data is acquired, as a priority period on a basis of the feature amount data; and generating teaching data to be input to the robot, the teaching data being generated on a basis of the motion data such that a motion of the operator in the priority period is reproduced while a motion of the operator in periods other than the priority period are not reproduced.

* * * * *